US012365420B2

(12) United States Patent
Ljøsne (10) Patent No.: US 12,365,420 B2
(45) Date of Patent: Jul. 22, 2025

(54) PEDALLY PROPELLED MULTI-SPEED GEAR SYSTEM

(71) Applicant: CA TECHNOLOGY SYSTEMS AS, Oslo (NO)

(72) Inventor: Knut Tore Ljøsne, Lom (NO)

(73) Assignee: MONT INVEST 30 AS, Oslo (NO)

( * ) Notice: Subject to any disclaimer, the term of this patent is extended or adjusted under 35 U.S.C. 154(b) by 0 days.

(21) Appl. No.: 18/560,062

(22) PCT Filed: Apr. 27, 2022

(86) PCT No.: PCT/NO2022/050094
§ 371 (c)(1),
(2) Date: Nov. 9, 2023

(87) PCT Pub. No.: WO2022/240294
PCT Pub. Date: Nov. 17, 2022

(65) Prior Publication Data
US 2024/0208609 A1    Jun. 27, 2024

(30) Foreign Application Priority Data

May 10, 2021   (NO) .................................. 20210586

(51) Int. Cl.
*B62M 11/18* (2006.01)
*B62M 11/16* (2006.01)

(52) U.S. Cl.
CPC ............. *B62M 11/18* (2013.01); *B62M 11/16* (2013.01)

(58) Field of Classification Search
CPC ................................ B62M 11/18; B62M 11/16
See application file for complete search history.

(56) References Cited

U.S. PATENT DOCUMENTS 4,973,297 A * 11/1990 Bergles ................. B62M 11/18
192/217.4
5,263,906 A    11/1993 Antonov
(Continued)

FOREIGN PATENT DOCUMENTS

DE    3930374 A1    4/1990
DE    19720796 A1    11/1998
(Continued)

OTHER PUBLICATIONS

International Search Report for PCT/NO2022/050094 mailed Jul. 12, 2022, 3 pages.
(Continued)

*Primary Examiner* — Tisha D Lewis
(74) *Attorney, Agent, or Firm* — NIXON & VANDERHYE (57) ABSTRACT

A pedally propelled vehicle multi-speed gear system with a number of unique gear-ratios, including a main shaft, an epicyclic gear section with an input and an output, the epicyclic gear section being arranged coaxially on the main shaft, the epicyclic gear section including a first and second interconnected epicyclic gear sets, and the first and second epicyclic gear sets including a sun gear, a planetary gear, and a ring gear, the main shaft including a support protrusion extending outwardly, the second sun gear being configured to be slidingly arranged on the main shaft and axially supported by the support protrusion in a direction.

22 Claims, 8 Drawing Sheets

(56) References Cited

U.S. PATENT DOCUMENTS

| | | | |
|---|---|---|---|
| 6,039,671 A * | 3/2000 | Keller | B62M 11/16 |
| | | | 475/296 |
| 6,048,287 A | 4/2000 | Rohloff | |
| 9,279,480 B2 | 3/2016 | Antal | |
| 2022/0055716 A1 * | 2/2022 | Ljøsne | F16H 3/66 |

FOREIGN PATENT DOCUMENTS

| | | | | |
|---|---|---|---|---|
| EP | 0762968 A1 | 3/1997 | | |
| EP | 1571077 A2 | 9/2005 | | |
| EP | 3431380 A1 * | 1/2019 | | B62M 11/14 |
| GB | 2249364 A | 5/1992 | | |
| WO | 9531365 A1 | 11/1995 | | |
| WO | 2020130841 A1 | 6/2020 | | |

OTHER PUBLICATIONS

Written Opinion of the ISA for PCT/NO2022/050094 mailed Jul. 12, 2022, 5 pages.

* cited by examiner

PEDALLY PROPELLED MULTI-SPEED GEAR SYSTEM

CROSS-REFERENCE TO RELATED APPLICATIONS

This application is the U.S. national phase of International Application No. PCT/NO2022/050094 filed Apr. 27, 2022 which designated the U.S. and claims priority to NO 20210586 filed May 10, 2021, the entire contents of each of which are hereby incorporated by reference.

The present invention relates to epicyclical internal gear mechanisms for pedally propelled vehicles.

BACKGROUND

Internal gear mechanisms for pedally vehicles are experiencing resurgence in popularity due to their robustness, long service life, and recent technological improvements. When external gears, which are exposed and prone to impacts, deteriorate quickly, and require frequent maintenance, are shifted, the chain bends sideways and its bushings wear and stretch which causes cogs and chain rings to wear prematurely.

Internal gears are in this sense more optimal, but typical multispeed ones cannot handle the high torque of rider and assist motor. Most internal gears are shifted solely by means of pawls, such as in and EP1571077 A2, or as in the case of e.g. DE19720796, with both pawls and axial clutches, although U.S. Pat. No. 9,279,480 offers improvement on many levels. Further optimization is desirable, to simplify, reduce cost, and improve function.

Some of the structural challenges involved in allowing higher torque have been addressed in WO2020130841A1, but issues related to compactness of the design and processing, manufacturing and logistics e.g. to reduce costs and to improve usability remain to be solved.

SHORT SUMMARY

A goal with the present invention is to provide a multi-speed gear system that is more compact, easier to process and manufacture and easier to handle logistically than prior art. This will contribute to reduced lifetime costs and potentially contribute to more environmentally friendly transport. The multi-speed gear system according to the invention may be used both for manually-only operated pedally propelled vehicles, as well as motor assisted vehicles.

The invention is in an aspect, a pedally propelled vehicle multi speed gear system according to the independent claims.

The functionality of the multi speed gear system is improved over prior art multi speed gear systems. Further, the number of components have been reduced, weight have been reduced, and assembly and maintenance have been simplified. This in turn allows the total cost of the gear to be reduced.

The multi-speed gear system according to the invention has in embodiments 7 independent gears with a gear range above 400%.

BRIEF DESCRIPTION OF THE DRAWINGS

in FIG. 10 and FIG. 11 will push the first and second indexing means together. The push force (F) from the resilient means is illustrated with an arrow. When the ball is pushed into a groove, it will act tangentially on the walls of the groove to provide a torque (T) that will force the shift axle (200) to rotate until the ball reaches the bottom of the groove where there is a torque balance, and the shift axle is in an indexed position (P). Further, the grooves are inclined in the axial direction and the push force (F) from the resilient means will result in a continuous axial force acting on the shift axle in the direction (D). This will improve sealing of the end of the rotating shift axle towards an abutting element.

FIG. 12 illustrates in a cross-section C-C the indexing system illustrated in FIG. 11. The second indexing means (230) here comprises first and second indexing elements (231, 232), both pressed radially inwards by the resilient means (240). The shift axle is here in an end indexed position (P), since the second indexing means (232) abuts the end stop (250) on a first side.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

In an independent embodiment EM 1, the invention is a pedally propelled vehicle multi-speed gear system (1) with a number of unique gear-ratios, comprising;
    a main shaft (5),
    an epicyclic gear section (10) with an input and an output, wherein the epicyclic gear section (10) is arranged coaxially on the main shaft (5), wherein the epicyclic gear section comprises a first and second interconnected epicyclic gear sets (11, 12), and wherein the first epicyclic gear set (11) comprises a first sun gear (111), first planetary gears (112), and a first ring gear (113), and
    the second epicyclic gear set (12) comprises a second sun gear (121), second planetary gears (122), and a second ring gear (123), wherein
    the multi-speed gear system (1) comprises first and second clutch sets (35, 45) arranged on respective sides of the epicyclic gear set (10), wherein
    the first clutch set (35) comprises a first outward clutch element (71) and radially stacked, axially movable first inner, middle and outer clutch elements (351, 352, 353),
    the second clutch set (45) comprises a second outward clutch element (72) and radially stacked, axially movable second inner, middle and outer clutch elements (451, 452, 453), wherein the epicyclic gear section (10) further comprises;
    a first carrier (101) holding the second planetary gears (122), wherein a first end (101a) is releasably connected to the first inner clutch element (351) and a second end (101b), opposite the first end is releasably connected to the second inner clutch element (451), wherein the first sun gear (111) is arranged rotationally fixed to the first carrier (101) between the first end (101a) and the second planetary gears (122), and wherein an inner diameter of the first sun gear (111) is larger than an outer diameter of the first end (101a).

In a first dependent embodiment, the second sun gear (121) is arranged rotationally fixed on the main shaft (5) and an inner diameter of the second end (101b) is larger than an outer diameter of the second sun gear (121).

In a second dependent embodiment, that may be combined with the first dependent embodiment, the epicyclic gear section (10) further comprises;
    a second carrier (102) holding the first planetary gears (112), wherein a wherein a first end (102a) is releasably connected to the first middle clutch element (352) and a second end (102b), opposite the first end is releasably connected to the second middle clutch element (452), wherein the second ring gear (123) is arranged rotationally fixed to the second carrier (102) between the second end (102b) and the second planetary gears (122), and wherein an inner diameter of the second end (102b) is larger than an outer diameter of the second ring gear (123).

In a third dependent embodiment, that may be combined with the first or second dependent embodiment, the epicyclic gear section (10) further comprises;
    an outer ring (103), wherein a first end (103a) is releasably connected to the first outer clutch element (353) and a second end (103b), opposite the first end is releasably connected to the second outer clutch element (453), wherein the first ring gear (113) is arranged rotationally fixed to the outer ring (103) between the first end and the second epicyclic gear set (12), and wherein the first end (102a) of the second carrier (102) is smaller than the inner diameter of the first ring gear (113).

Identical Elements

In a fourth dependent embodiment, that may be combined with any of the first to third dependent embodiments, wherein the first and second planetary gears (112, 122) are identical.

In a fifth dependent embodiment, that may be combined with any of the first to fourth dependent embodiments, the first and second inner clutch elements (351, 451) are identical and symmetrically arranged about the epicyclic gear section (10).

In a sixth dependent embodiment, that may be combined with any of the first to fifth dependent embodiments, the first and second middle clutch elements (351, 451) are identical and symmetrically arranged about the epicyclic gear section (10).

In a seventh dependent embodiment, that may be combined with any of the first to sixth dependent embodiments, the first and second outer clutch elements (351, 451) are identical and symmetrically arranged about the epicyclic gear section (10).

In an eight dependent embodiment, that may be combined with any of the first to seventh dependent embodiments, the first and second clutch sets (35, 45) comprises first and second static and dynamic shift rings (331, 431, 341, 441), and one or more shift balls (312, 412), respectively, wherein the shift balls are configured to move radially and to abut inclined surfaces of a pair of first and second static and dynamic shift rings (331, 431, 341, 441) to axially move the dynamic shift rings (341, 441) inwardly towards the epicyclic gear section (10) when extending radially.

In a ninth dependent embodiment, that may be combined with any of the first to eight dependent embodiments, the first clutch set (35) is configured to sequentially release the first inner and middle clutch elements (351, 352) when the first dynamic shift ring (341) moves inwardly and the second clutch set (45) is configured to sequentially release the outer and middle clutch elements (453, 452) when the second dynamic shift ring (441) moves inwardly. In order to operate the second clutch set (45) from outer to middle, a thrust disk (411) is used.

In an independent embodiment EM 2, that may also be combined with EM1, a pedally propelled vehicle multi-speed gear system (1) with a number of unique gear-ratios, comprises;
a main shaft (5),
an epicyclic gear section (10) with an input and an output, wherein the epicyclic gear section (10) is arranged coaxially on the main shaft (5), wherein the epicyclic gear section comprises a first and second interconnected epicyclic gear sets (11, 12), and wherein
the first epicyclic gear set (11) comprises a first sun gear (111), first planetary gears (112), and a first ring gear (113), and
the second epicyclic gear set (12) comprises a second sun gear (121), second planetary gears (122), and a second ring gear (123), wherein the main shaft (5) comprises a support protrusion (131) extending outwardly, and wherein the second sun gear (121) is configured to be slidingly arranged on the main shaft (5) and axially supported by the support protrusion (131) in a direction (D).

In a first dependent embodiment, the multi-speed gear system (1) comprises a first carrier (101) holding the second planetary gears (122), wherein the first carrier is configured to be slidingly arranged on the main shaft in the axial direction (D) until it is axially supported by the second sun gear (121).

In a second dependent embodiment, that may be combined with the first dependent embodiment, the multi-speed gear system (1) comprises a second carrier (102) holding the first planetary gears (112), wherein the second carrier is configured to be slidingly arranged on the main shaft in the axial direction (D) until it is axially supported by the first carrier (101).

In a third dependent embodiment, that may be combined with the second dependent embodiment, the multi-speed gear system (1) comprises an internally arranged first ring gear (113), wherein the outer ring (103) is configured to be slidingly arranged on the main shaft in the axial direction (D) until the first ring gear (113) is axially supported by the second carrier (102).

In a fourth dependent embodiment, that may be combined with the third dependent embodiment, the multi-speed gear system (1) comprises a first thrust ring (134) configured to be slidingly arranged on the main shaft in the axial direction (D) until it is axially supported by outer ring (103).

In a fifth dependent embodiment, that may be combined with the fourth dependent embodiment, the multi-speed gear system (1) comprises a first housing (170) configured to be slidingly arranged on the main shaft in the axial direction (D) until it is axially supported by first thrust ring (134).

Figure 1:
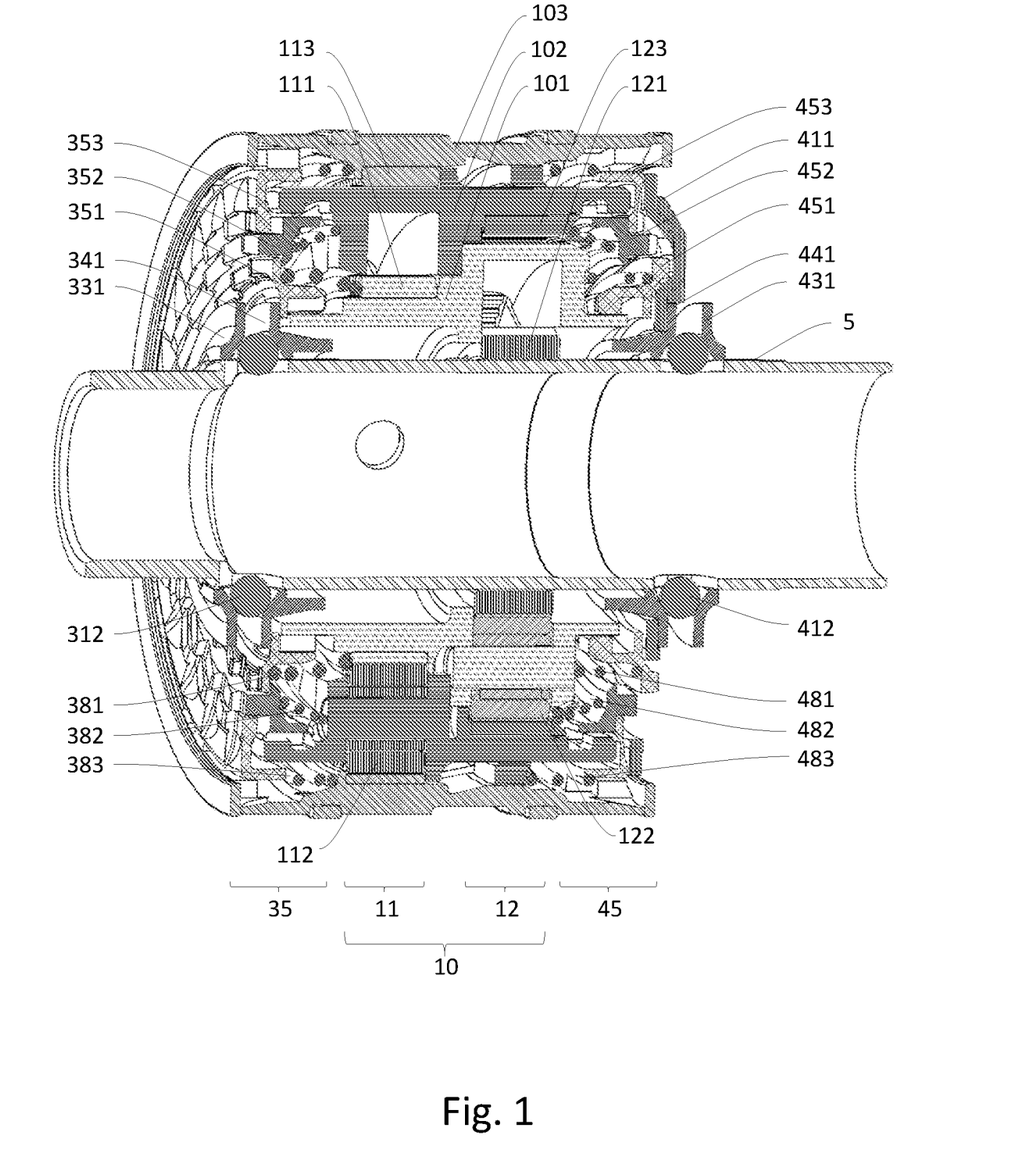
FIG. 1 illustrates in a perspective section view some of the elements of a multi-speed gear system (1) according to an embodiment of the invention.
Figure 2:
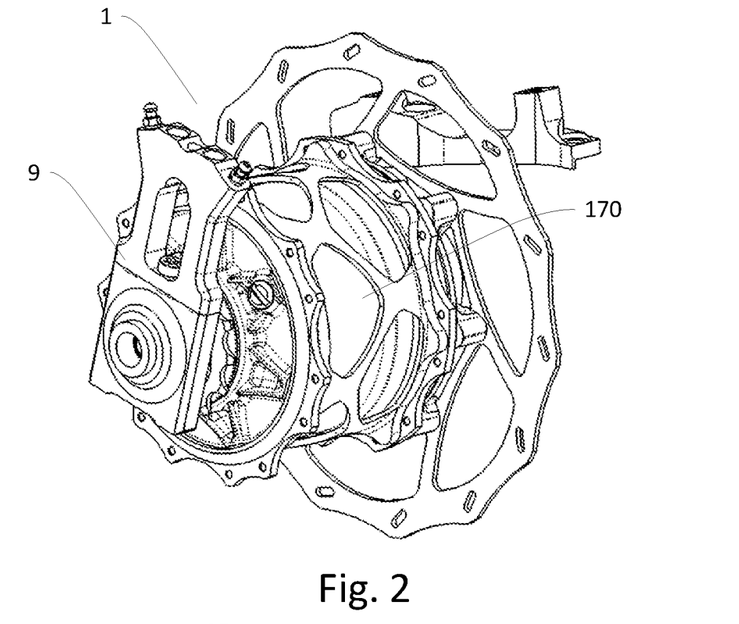
FIG. 2 illustrates in a perspective view a multi-speed gear system (1) with a gear shift actuator (9) according to an embodiment of the invention.
Figure 3A:
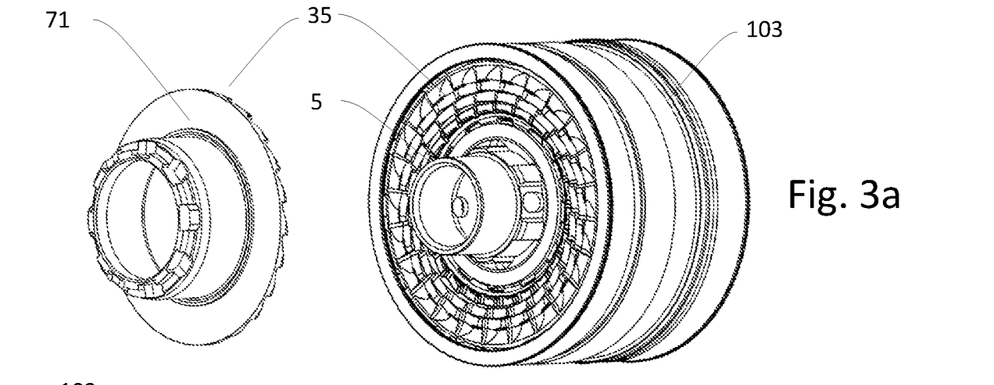
FIGS. 3a and 3b Illustrate in different perspective views, some elements of a multi-speed gear system (1), wherein the outer ring (103) comprises an epicyclic gear section (hidden) and first and second clutch sets (35, 45) arranged on opposite sides of the gear section. A first outward clutch element (71) may be the driving element and connected to e.g., a cog wheel. A second outward clutch element (72) may be the driven element and is in this embodiment driving the first housing (170), seen in FIG. 1. The main shaft (5) may be rotationally fixed to a frame of a vehicle.
Figure 3B:
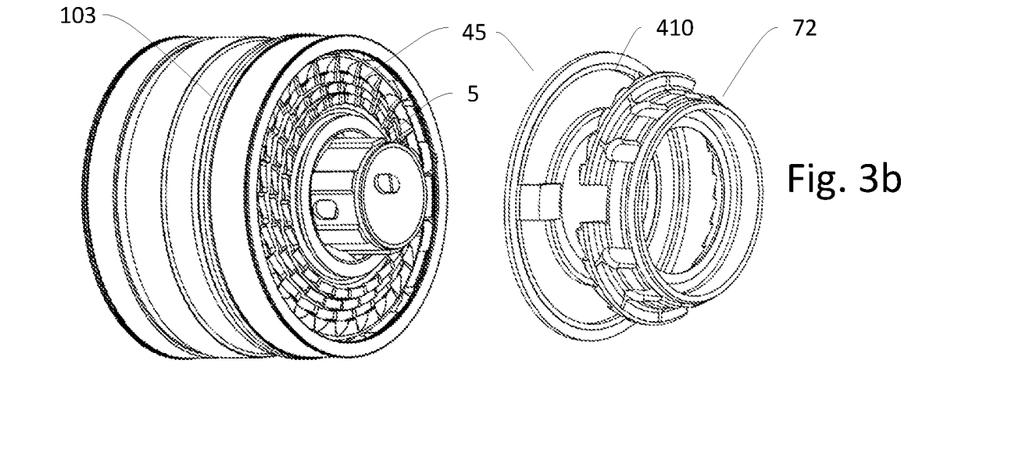
Figure 4:
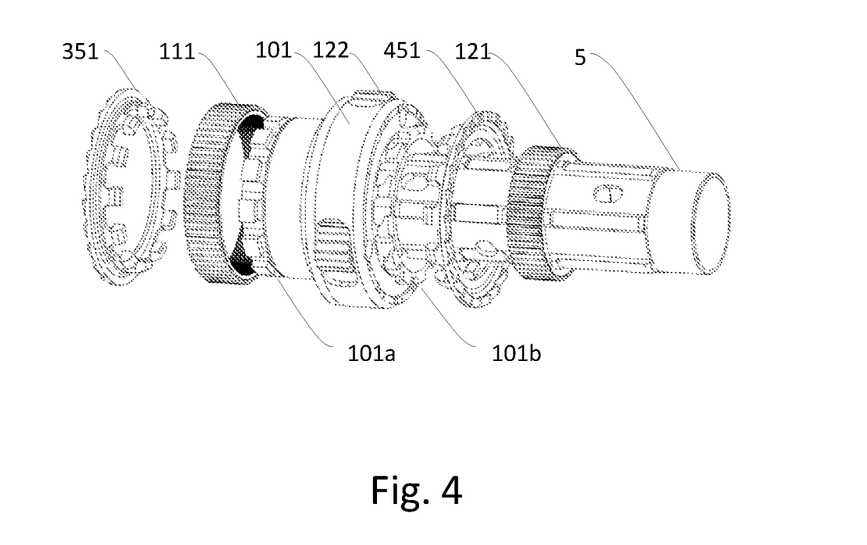
FIG. 4 is an exploded perspective view of some inner elements of an embodiment of a multi-speed gear system (1). As can be seen the elements shown can be assembled axially in a specific order.
Figure 5:
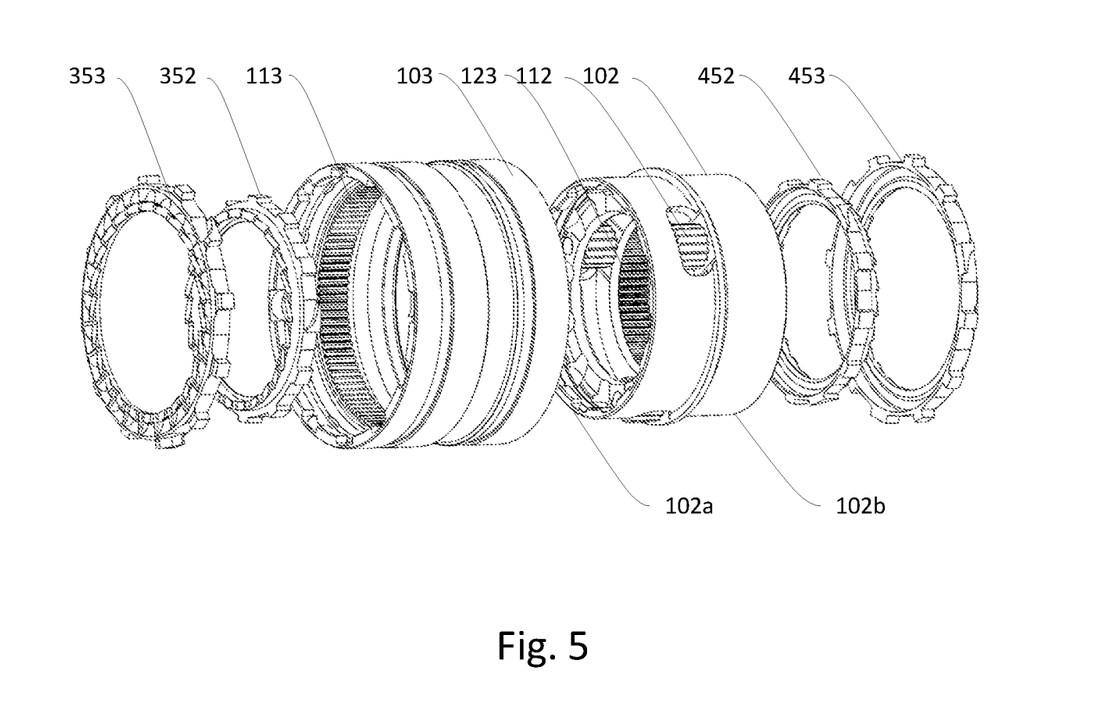
FIG. 5 is an exploded view of some of the middle and outer elements of an embodiment of a multi-speed gear system (1). As can be seen the elements shown can be assembled axially in a specific order and combined with the inner elements in FIG. 4 to make up the cartridge shown in FIG. 4.
Figure 6:
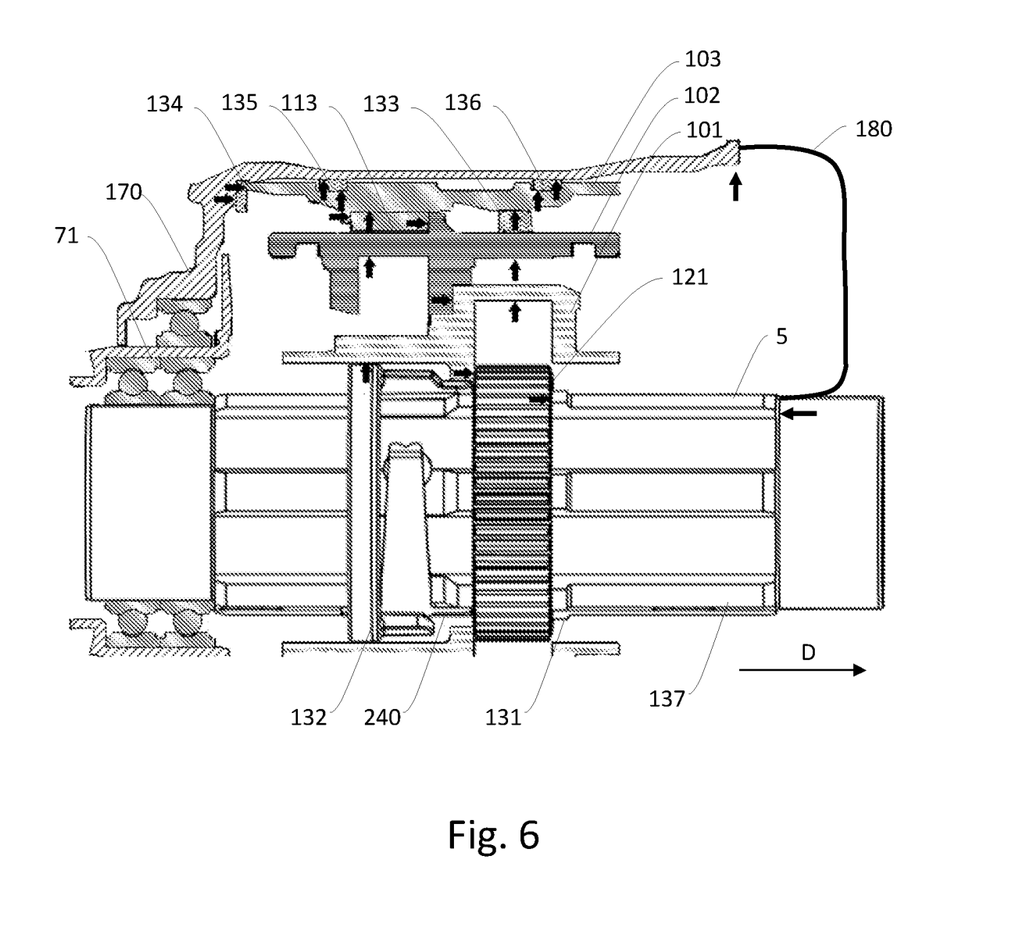
FIG. 6 is a combined section view, side view and diagrammatic view of some of the elements of a multi-speed gear system (1). More specifically it illustrates with vertical and horizontal arrows some radially and axially interacting surfaces, respectively. This allows full alignment without the needs for adding shims etc., during assembly.
Figure 7:
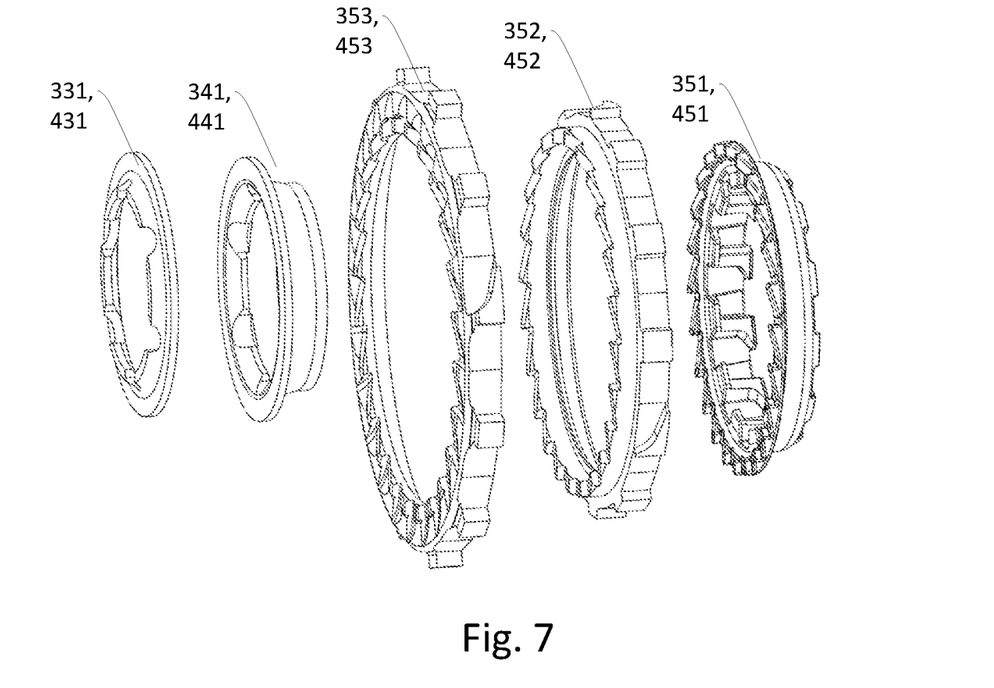
FIG. 7 illustrates in perspective views, that first inner, middle and outer clutch elements (351, 352, 353) of a multi-speed gear system (1) are identical to the second inner, middle and outer clutch elements (451, 452, 453).
Figure 8:
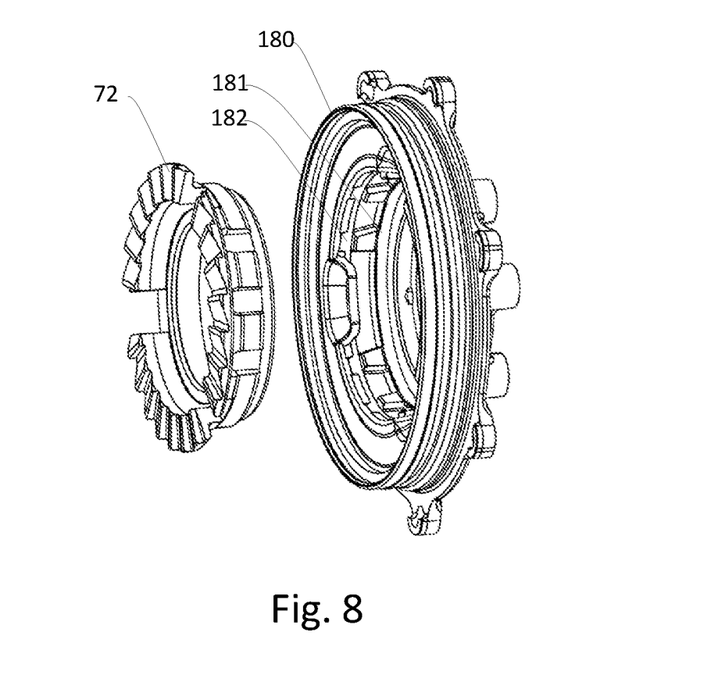
FIG. 8 illustrates in an exploded perspective view the interaction between the second outward clutch element (72) and the housing cover (180). Dogs (180a) and recesses in the housing cover match corresponding dogs and recesses in the second outward clutch element (72). Further, the second outward clutch element (72) is radially and axially locked in the direction (D) by the housing cover (180).
Figure 9:
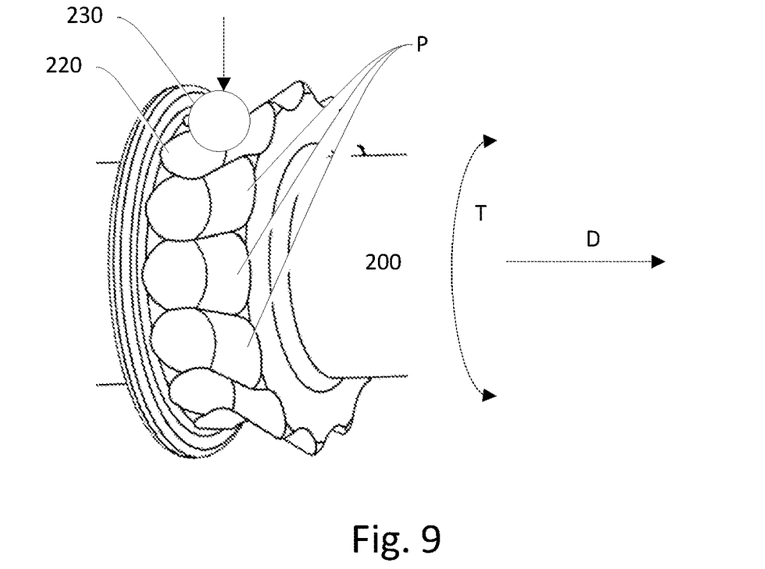
FIG. 9 illustrates in a perspective view a detail of the indexing system according to an embodiment of the invention. The first indexing means (220), here illustrated as grooves are rotationally fixed with respect to the shift axle (200). The second indexing means (230), here illustrated as ball(s), are rotationally fixed with respect to the multi-speed gear system. Resilient means (240) illustrated e.g.
Figure 10:
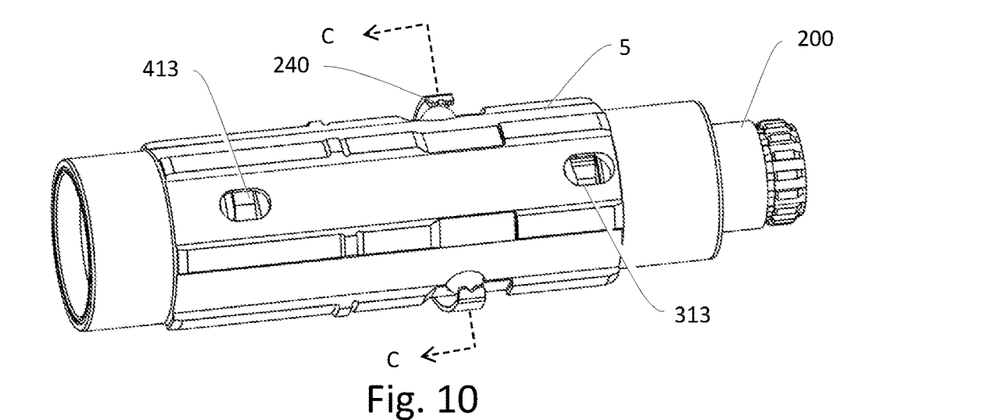
FIG. 10 illustrates in a perspective view the same indexing system and shift axle (200) as in FIG. 9, partly arranged inside a main shaft (5) of the multi-speed gear system.

In a sixth dependent embodiment, that may be combined with the fifth dependent embodiment, the multi-speed gear system (1) comprises a housing cover (180) configured to be slidingly arranged on the main shaft (5) in a direction opposite the axial direction (D), and to force the main shaft opposite the axial direction (D). Further, the housing cover (180) is configured to rotate relative to the main shaft (5). In FIG. 6 the aggregation of the housing cover (180) and a bearing has been indicated as a line to simplify presentation. In the opposite end of the main shaft (5), the first housing is axially locked to the main shaft by ball bearings as illustrated, wherein the first outward clutch element (71) is arranged between the main shaft (5) and the first housing (170), and axially fixed in the direction (D).

When the housing cover is in place all internal parts of the gear are axially locked in both directions.

Some of the interfaces with axial support are indicated with horizontal arrows. Some of the interfaces are rotational, while others are fixed.

In a seventh dependent embodiment, that may be combined with any of the first to sixth dependent embodiments, the first thrust ring (134) may comprise plastic material.

In an independent embodiment EM 3, that may also be combined with EM1 or EM2, a pedally propelled vehicle multi-speed gear system (1) with a number of unique gear-ratios comprises;
a main shaft (5),
an epicyclic gear section (10) with an input and an output, wherein the epicyclic gear section (10) is arranged coaxially on the main shaft (5), wherein the epicyclic gear section comprises a first and second interconnected epicyclic gear sets (11, 12), and wherein
the first epicyclic gear set (11) comprises a first sun gear (111), first planetary gears (112), and a first ring gear (113), and
the second epicyclic gear set (12) comprises a second sun gear (121), second planetary gears (122), and a second ring gear (123), wherein
the second sun gear (121) is arranged on the main shaft (5), and wherein the second epicyclic gear set (12) is radially supported by the main shaft (5).

In a first dependent embodiment, the first sun gear (111) is arranged on the first carrier (101), and wherein the multi-speed gear system (1) comprises an inner support ring (132) arranged between the main shaft (5) and the first carrier (101), wherein the first epicyclic gear set (11) is radially supported by the inner support ring (132).

In a first dependent embodiment, that may be combined with the first dependent embodiment, multi-speed gear system (1) comprises an outer ring (103) comprising the first ring gear (113), wherein the outer ring is radially supported by the first ring gear (113), and wherein the multi-speed gear system (1) further comprises a middle support ring (133) arranged between the second carrier (102) and the outer ring (103), wherein the outer ring (103) is radially supported by the middle support ring (133).

In a second dependent embodiment, that may be combined with the first dependent embodiment, the multi-speed gear system (1) comprises a first housing (170), and first and second axially spaced outer support rings (135, 136) arranged between the housing and the outer ring (103), wherein the outer ring (103) is radially supported by the first housing (170) by the first and second outer support rings (135, 136).

In a third dependent embodiment, that may be combined with the second dependent embodiment, the multi-speed gear system (1) comprises a housing cover (180) fixed to the first housing (170) and rotationally fixed to the main shaft (5). In FIG. 6 the aggregation of the housing cover (180) and a bearing has been indicated as a line to simplify presentation.

When the housing cover is in place, the first housing (170) is radially locked to the main shaft (5) in one end. In the opposite end, the first housing is radially locked to the main shaft by ball bearings as illustrated, wherein the first outward clutch element (71) is arranged between the main shaft (5) and the first housing (170), rotationally with regard to both.

Some of the interfaces with radial support are indicated with vertical arrows. Some of the interfaces are rotational, while others are fixed.

In a fourth dependent embodiment, that may be combined with any of the first to third dependent embodiments, any of the inner support ring (132), middle support ring (133), first and second outer support rings (134,135) may comprise plastic material.

In an independent embodiment EM 4, that may also be combined with any of EM 1 to EM 3, a pedally propelled vehicle multi-speed gear system (1) with a number of unique gear-ratios, comprises;
a main shaft (5),
an epicyclic gear section (10) with an input and an output, wherein the epicyclic gear section (10) is arranged coaxially on the main shaft (5), wherein the epicyclic gear section comprises a first and second interconnected epicyclic gear sets (11, 12), and wherein
the first epicyclic gear set (11) comprises a first sun gear (111), first planetary gears (112), and a first ring gear (113), and
the second epicyclic gear set (12) comprises a second sun gear (121), second planetary gears (122), and a second ring gear (123), wherein
the teeth ratio between the first sun gear (111) and the first ring gear (113) is 0.7+/−0.1, and the teeth ratio between the second sun gear (111) and the second ring gear (113) is 0.6+/−0.1.

In a first dependent embodiment, wherein the teeth ratio between the second ring gear (123) and the first ring gear (113) is 0.82+/−0.15.

In a second dependent embodiment, that may be combined with the first dependent embodiment, wherein the first and second planetary gears (112, 122) have an identical number of teeth.

In an independent embodiment EM 4, that may also be combined with any of EM 1 to EM 4, a pedally propelled vehicle multi-speed gear system (1) with a number of unique gear-ratios comprises
a main shaft (5),
an epicyclic gear section (10) with an input and an output, wherein the epicyclic gear section (10) is arranged coaxially on the main shaft (5), and
first and second clutch sets (35, 45) arranged on respective sides of the epicyclic gear set (10), wherein the main shaft (5) has a uniform inner diameter inside the epicyclic gear section (10) and the first and second clutch sets (35, 45).

In a first dependent embodiment, the main shaft (5) comprises aluminum.

In a second dependent embodiment that may be combined with the first dependent embodiment, the main shaft (5) comprises longitudinal splines (137) configured to rotationally lock any of the sun gears to the main shaft (5).

In a third dependent embodiment that may be combined with the first dependent or second dependent embodiments the main shaft (5) comprises a support protrusion (131) extending radially outside the splines to lock one of the sun gears in one axial direction.

In a fourth dependent embodiment that may be combined with any of the first to third dependent embodiments, the splines (137) may be configured to rotationally hold any of;
resilient means (240) configured to resiliently push first and second indexing means radially into holes in the main shaft (5).
a shaft end sleeve configured to be rotationally fixed to the frame of a vehicle.
first and second dynamic shift rings (341, 441)

In a fifth dependent embodiment that may be combined with any of the first to fourth dependent embodiments, the main shaft (5) comprises one or more through holes (313, 413) for one more shift balls (312, 412) arranged to move radially with regards to the one or more holes.

In an independent embodiment EM 6, that may also be combined with any of EM 1 to EM 5, a pedally propelled vehicle multi-speed gear system (1, 1001) with a number of unique gear-ratios comprises
a housing (170, 1170),
a first seal (51),
a first axle (200) extending through the first seal (51) and a wall of the housing (170, 1170), wherein the first axle (200) is configured to rotate relative to the housing, and
a breather passage configured to release a difference in pressure between the inside and outside of the housing in any three dimensional rotational position of the multi-speed gear system.

The first axle may be a shift axle.

In a first dependent embodiment, the housing is configured to be partly filled with a liquid lubricant, wherein the breather passage has a first end (31) and a second end (32), wherein the first end (31) is external to the housing and the second (32) end is internal to the housing, and wherein the second end is configured to stay above the liquid lubricant in any three dimensional rotational position of the multi-speed gear system.

In a second dependent embodiment that may be combined with the first dependent embodiment, the first axle (200) is hollow, and wherein at least parts of the first axle (200) constitutes at least a part of the breather passage.

In a third dependent embodiment that may be combined with the first or second dependent embodiment, the second end (32) is a breathing hole in the wall of the first axle (200).

In a fourth dependent embodiment, that may be combined with any of the first to third embodiments, the gear system comprises a main shaft (5) arranged coaxially outside the shift axle (200) and configured to rotate relative to the shift axle, wherein the main shaft comprises a first hole (313), wherein a fluid passage is maintained between the second end (32) and the first hole independent of the rotational position between the main shaft and the shift axle.

The second end of the breather passage may be arranged substantially in the middle of the housing.

Figure 14:
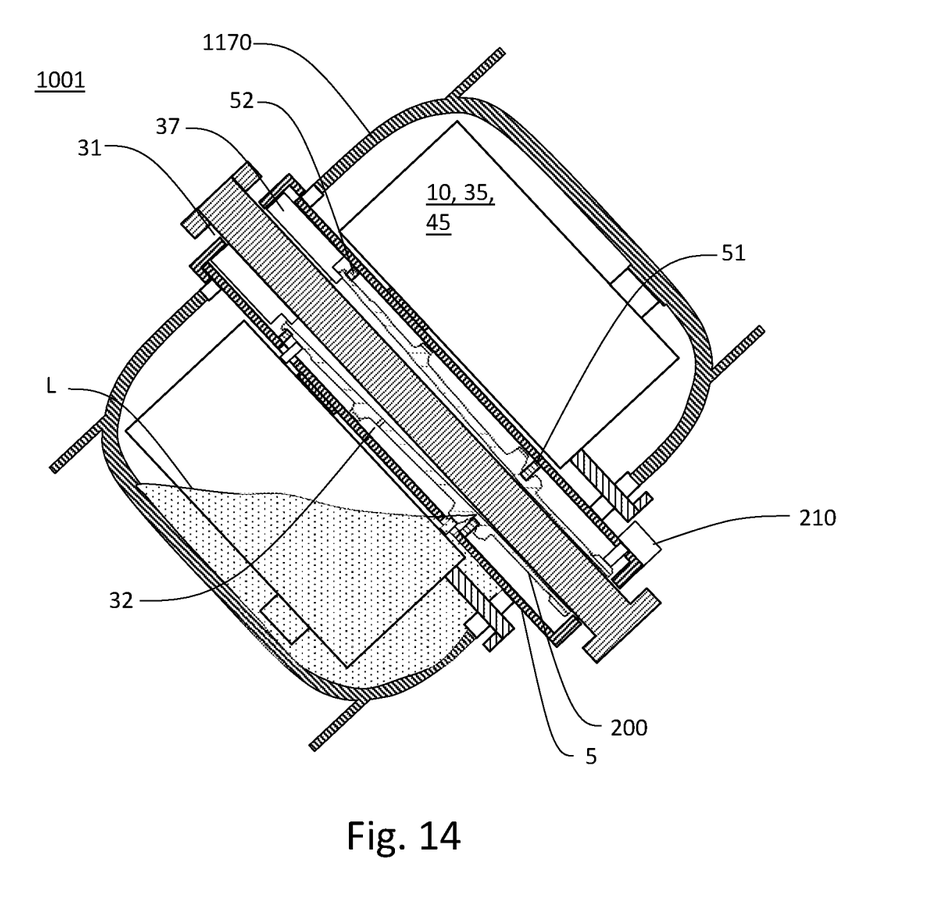
FIG. 14 FIG. illustrates in a combined diagrammatic and section view a multi-speed gear system (1001), according to an embodiment of the invention comprising a breather passage that may prevent leaks when the pressure difference between an inside and outside of a housing changes, for example, due to atmospheric or temperature changes.

A specific embodiment of the breather passage is shown in FIG. 14. Inside the housing (1170) there is an epicyclic gear section (10), and first and second clutch sets as (35, 45) as described elsewhere in this document. The main shaft (5) extends through the housing. Inside the main shaft is the shift axle (200), hollow to allow a through-bolt (45) therethrough to fix the main shaft (5) to a frame, such as a bicycle frame.

Here, the second sun gear (121) is rotationally fixed to the main shaft (5). Gears may be shifted by rotating the shift axle (200) by an actuator (210).

First and second seals (51, 52) are arranged, respectively, between the shift axle and the main shaft. The area between the seals can be considered as belonging to the internal of the housing, sealed away from external dust, pollution etc. Similarly, any fluid, such as lubrication between the seals is prevented from leaking out of the housing by the seals.

To allow the shift axis (200) to rotate, its inner diameter is larger than the outer diameter of the through-bolt (45). This gives room for a breather passage between the first end (31) at the end of the main shaft (5) and the second end (32), which is the breather hole through the wall of the shift axle (200). In both ends there might be dust-caps (37) or similar elements to protect the gear from dirt and dust, but this does not prevent alignment of pressure through the breather passage.

Further, the breather passage is in fluid communication with the rest of the internal of the housing (1170), i.e., the space outside the shift axle (200), through first and second holes (313, 413). These holes are used to house shift balls (312, 412) arranged between the shift cams (211, 212) of the shift axle (5) and the first and second clutch sets, but are in this case also used to allow fluid to pass through.

In this case the first and second holes (313, 413) may be said to have multiple roles. First of all they allow operation of the clutches in the internal gear from the shift axle. Second, they allow lubrication of the shift cams, and third, they are part of a breathing passage between the internal and external of the housing to allow constant pressure alignment to reduce wear on the internal components.

In this embodiment it is assumed that the housing contains liquid lubrication, and the liquid level (L) has been indicated. In this position the mechanical power transmission can breathe as explained above.

In FIG. 14 the multi-speed gear system is illustrated tilted over to the side. As the gear system is tilted, the liquid level (L) changes relative to the housing, and the main shaft may be covered by the liquid. The liquid may enter into the first or second holes (313, 413) interconnecting the annulus between the main shaft and the shift axle with the interior gear chamber of the housing. However, as long as the second end (32) of the breather passage is arranged substantially in the middle of the housing, the liquid will normally not be able to escape the gear system.

It should also be mentioned that liquid that has reached the annulus in this situation will drain into the main housing through the first or second holes (313, 413) as soon as the gear system rotates back to the normal position where the main shaft is substantially horizontal.

Further, since the first and second seals (51, 52) are arranged adjacent outside the first and second holes (313, 413), respectively, liquid will not be accumulated in the annuli of the ends between the main shaft and the shift axle.

Figure 11:
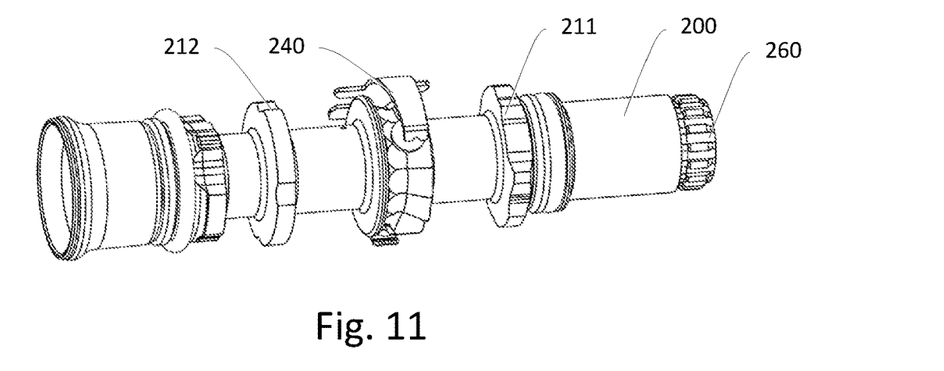
FIG. 11 illustrates the same indexing system and shift axle (200) as in FIG. 10, but without the main shaft and in a different perspective view. The shift axle in this case has first and second shift cams (211, 212) and a shift actuator interface (260) in an end in the direction (D) in the form of a spline coupling.
Figure 12:
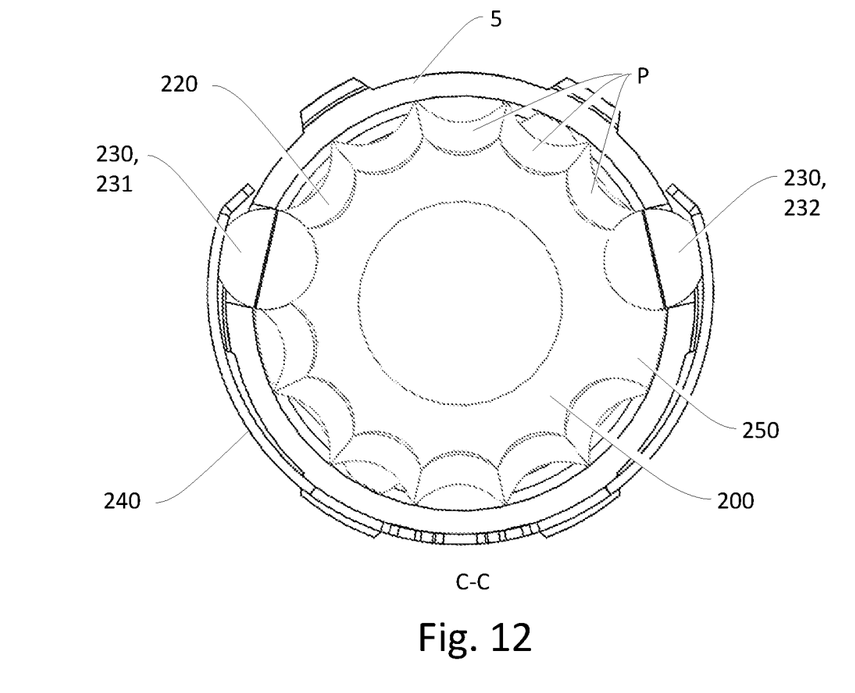
Figure 13:
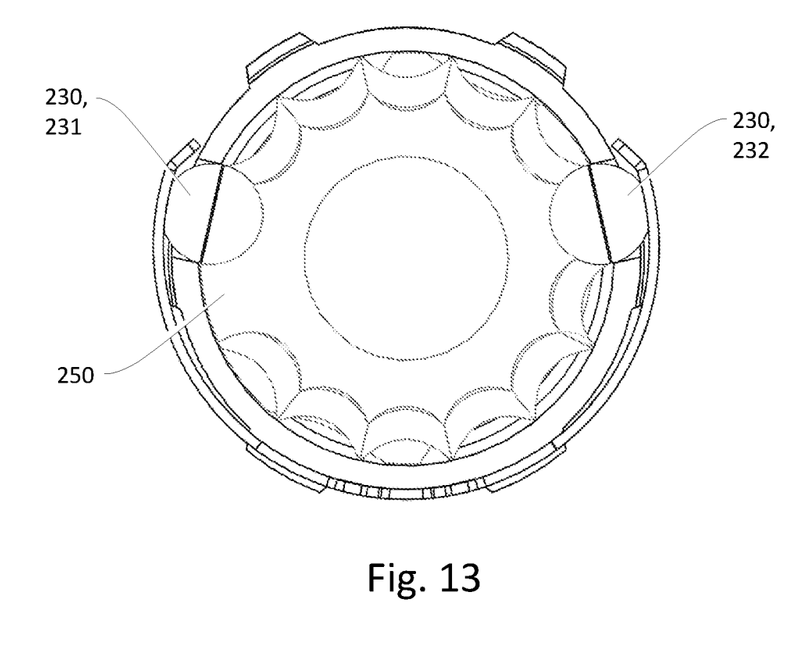
FIG. 13 illustrates the same cross-section as in FIG. 12, where the shift axle has been turned around clockwise until a second side of the end stop, opposite the first side, abuts the first indexing means (231). The indexing means illustrated here comprises seven available indexing positions and could typically be used to for indexing shifting of a multi-speed gear system with seven unique gear ratios.

In FIG. 11, it can be seen that a guide cam, configured to radially guide the shift axle (200) inside the second axle (42), may have one or more radial recesses to allow breathing between the second end (32) main hole and the first and second shift cams (44a, 44b)

In an independent embodiment EI 1, that may also be combined with any of EM 1 to EM 6, a pedally propelled vehicle multi-speed gear system (1) with a number of unique gear-ratios comprises;
a shift axle (200) configured to rotate between indexed positions (P), wherein each indexed position corresponds to a unique gear-ratio of the multi-speed system,
an indexing system, configured to rotate the shift axle to the rotationally closest indexed position, and further configured to provide a continuous axial push of the shift axle in a first direction (D).

In a first dependent embodiment, wherein the indexing system (210) comprises;
first indexing means (220) rotationally fixed with respect to the shift axle,
second indexing means (230) rotationally fixed with respect to the multi-speed gear system, and
resilient means (240) configured to resiliently push the first and second indexing means together.

In a second dependent embodiment, that may be combined with the first dependent embodiment, the first indexing means (220) comprises recesses arranged along at least a part of a perimeter of a first cross section perpendicular to the axial direction of the shift axle (200) and the second indexing means (230) is configured to interact with walls of said recesses to provide a torque to rotate the shift axle to the rotationally closest indexed position (P).

In a third dependent embodiment that may be combined with the first or second dependent embodiment, the indexing system is in a torque balance when the shift axle is in an indexed position. I.e., the torque from the indexing system is zero when the shift axle is in the indexed position. However, once a rotational force starts acting on the shift axle to rotate the shift axle of the indexed position in any direction, the indexing system will set up a counter torque to try to maintain equilibrium. A gear shifting torque acting on the shift axle will have to overcome the counter torque to switch over to the next indexed position. Once the next indexed position is rotationally closer than the previous indexed position, the indexing system will contribute with a torque towards a torque equilibrium in the next indexed position.

In a fourth dependent embodiment, that may be the first indexing means (220) is configured to interact with the second indexing means (230) in a first interaction point (241) with a first radius when the shift axle in a torque balance in the first cross section, and to interact with the second indexing means (230) in a second interaction point (241) with a second radius when the shift axle is in a torque balance in a second cross section, wherein the second cross section is in the first direction (D) with regards to the first cross connection, and the second radius is larger than the first radius. Further, the first and second cross-sections are separated with a distance larger than zero.

In a fourth dependent embodiment, that may be combined with any of the dependent embodiments above, the shift axle (200) is configured to rotate between a lower indexed position and an upper indexed position, wherein the radius of any point of the perimeter of the first indexing means, between the lower and upper indexed positions, increases in the first direction (D).

In an embodiment EI 2, that may be combined with EI1, the indexing system comprises a rotational end stop (250) configured to prevent rotation of the shift axle (200) below a lower indexed position and above an upper indexed position.

In a first dependent embodiment, the end stop (250) is a protrusion of the shift axle configured to abut the first indexing means (230) when the shift axle (200) reaches the lower and upper indexed positions.

In an embodiment EI3, that may be combined with EI1 or EI2, the multi-speed gear system comprises a number of unique-gear ratios, wherein the second indexing means comprises first and second indexing elements (231, 232)

separated by a first number of indexed positions (P) equal to the number of unique gear-ratios.

In a first dependent embodiment the first indexing means comprises X number of recesses, wherein X is one less than the number of unique gear-rations times two.

In a second dependent embodiment, that may be combined with the first dependent embodiment, any of the first and second indexing elements (231, 232) are balls.

In an embodiment EI 4, that may be combined with any of EI 1 to EI 3, the resilient means (240) is a clamping spring, clamped over more than half the perimeter of the shift axle.

In a dependent embodiment, the multi-speed gear system comprises a main shaft (5) wherein the shift axle (200) is arranged inside the main shaft, and wherein the main shaft comprises one or more holes for the second indexing means (230), wherein the second indexing means (230) are pressed into the holes by the resilient means clamped around the main shaft (5).

The shift axle (200) may in any of the embodiments above be configured to host coaxially internally a through bolt or through axle for easy mounting and removal of a wheel with the multi-speed gear hub to the vehicle.

In an independent embodiment EM 7, the invention is a method for producing a pedally propelled vehicle multi-speed gear system (1) according to any of EM 1 to EM 6, and EI to EI 4, wherein the gear system comprises a second outward clutch element (72) and a housing cover (180), wherein the second outward clutch element (72) is configured to drive the housing cover (180) with matching dogs, and the housing cover (180) comprises inner first and second support cylindrical surfaces (181, 182) arranged below and above the dogs, respectively, wherein the method comprises;

casting or forging the housing cover (180) with the first cylindrical surface (181) and dogs extending sufficiently high to easily remove the housing cover from the mold, lathing the upper part of the dogs to produce the second cylindrical surface.

Thus, the production of a driven housing cover with radial and axial support can be simplified, and no costly milling operation is required.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A pedally propelled vehicle multi-speed gear system for use with a vehicle, the gear system having a number of different gear-ratios, the gear system comprising:
    a main shaft comprising a support protrusion extending outwardly;
    an epicyclic gear section with an input and an output, the epicyclic gear section being disposed coaxially on the main shaft, the epicyclic gear section comprising
        a first interconnected epicyclic gear set, the first epicyclic gear set comprising
            a first sun gear,
            first planetary gears, and
            a first ring gear, and
        a second interconnected epicyclic gear set, the second epicyclic gear set comprising
            a second sun gear configured to be slidingly disposed on the main shaft and axially supported by the support protrusion in a direction,
            second planetary gears, and
            a second ring gear; and
        a first carrier holding the second planetary gears, the first carrier being configured to slide on the main shaft in the axial direction until the first carrier is axially supported by the second sun gear.

2. The pedally propelled vehicle multi-speed gear system according to claim 1, further comprising:
    a second carrier holding the first planetary gears, the second carrier being configured to slide on the main shaft in the axial direction until the second carrier is axially supported by the first carrier;
    an internally disposed first ring gear; and
    an outer ring configured to slide on the main shaft in the axial direction until the first ring gear is axially supported by the second carrier.

3. The pedally propelled vehicle multi-speed gear system according to claim 2, further comprising a first thrust ring configured to slide on the main shaft in the axial direction until the first thrust ring is axially supported by the outer ring.

4. The pedally propelled vehicle multi-speed gear system according to claim 3, further comprising a first housing configured to slide on the main shaft in the axial direction until the first housing is axially supported by the first thrust ring.

5. The pedally propelled vehicle multi-speed gear system according to claim 1, wherein the second sun gear is disposed on the main shaft,
    wherein the second epicyclic gear set is radially supported by the main shaft,
    wherein the first sun gear is disposed on the first carrier, and
    wherein the multi-speed gear system further comprises an inner support ring disposed between the main shaft and the first carrier, the first epicyclic gear set being radially supported by the inner support ring.

6. The pedally propelled vehicle multi-speed gear system according to claim 5, further comprising:
    an outer ring comprising the first ring gear, the outer ring being radially supported by the first ring gear; and
    a middle support ring disposed between the second carrier and the outer ring, the outer ring being radially supported by the middle support ring.

7. The pedally propelled vehicle multi-speed gear system according to claim 6, further comprising:
    a first housing; and
    first and second axially spaced outer support rings disposed between the housing and the outer ring,
    wherein the outer ring is radially supported by the first housing by the first and second outer support rings.

8. The pedally propelled vehicle multi-speed gear system according to claim 1, wherein the teeth ratio between the first sun gear and the first ring gear is 0.7+/−0.1, and the teeth ratio between the second sun gear and the second ring gear is 0.6+/−0.1.

9. The pedally propelled vehicle multi-speed gear system according to claim 8, wherein the teeth ratio between the second ring gear and the first ring gear is 0.82+/−0.15.

10. The pedally propelled vehicle multi-speed gear system according to claim 1, wherein the first and second planetary gears have an identical number of teeth.

11. The pedally propelled vehicle multi-speed gear system according to claim 1, further comprising first and second clutch sets,
wherein the main shaft has a uniform inner diameter inside the epicyclic gear section and the first and second clutch sets.

12. The pedally propelled vehicle multi-speed gear system according to claim 11, wherein the main shaft comprises longitudinal splines configured to rotationally lock any of the sun gears to the main shaft.

13. The pedally propelled vehicle multi-speed gear system according to claim 11, wherein the support protrusion extends radially outside the splines to lock the second sun gear in one axial direction.

14. The pedally propelled vehicle multi-speed gear system according to claim 11, wherein the splines are configured to rotationally hold one or more of:
(i) a resilient spring configured to resiliently push a plurality of grooves and a plurality of balls radially into holes in the main shaft,
(ii) a shaft end sleeve configured to be rotationally fixed to a frame of the vehicle, and
(iii) first and second dynamic shift rings.

15. The pedally propelled vehicle multi-speed gear system according to claim 11, wherein the main shaft comprises one or more through holes for one or more shift balls configured to move radially with regards to the one or more holes.

16. The pedally propelled vehicle multi-speed gear system according to claim 1, further comprising:
a housing;
a first seal;
a shift axle extending through the first seal and a wall of the housing, the shift axle being configured to rotate relative to the housing; and
a breather passage configured to release a difference in pressure between the inside and outside of the housing in any three-dimensional rotational position of the multi-speed gear system.

17. The pedally propelled vehicle multi-speed gear system according to claim 1, further comprising:
a shift axle configured to rotate between indexed positions, each of the indexed positions corresponding to a respective different gear-ratio of the multi-speed system; and
an indexing system configured to rotate the shift axle to the rotationally closest indexed position, and to provide a continuous axial push of the shift axle in a first direction.

18. The pedally propelled vehicle multi-speed gear system according to claim 17, wherein the indexing system comprises:
a plurality of recesses rotationally fixed with respect to the shift axle,
a plurality of balls rotationally fixed with respect to the multi-speed gear system, and
a resilient spring configured to resiliently push the recesses and the balls together.

19. The pedally propelled vehicle multi-speed gear system according to claim 18, wherein the recesses are configured to interact with the balls in a first interaction point with a first radius when the shift axle in a torque balance in the first cross-section, and to interact with the balls in a second interaction point with a second radius when the shift axle is in a torque balance in a second cross-section,
wherein the second cross-section is in the first direction with respect to the first cross-section, the second radius is larger than the first radius, and the first and second cross-sections are separated with a distance larger than zero.

20. The pedally propelled vehicle multi-speed gear system according to claim 18, wherein the shift axle is configured to rotate between a lower indexed position and an upper indexed position,
wherein a radius of any point of a perimeter of the recesses, between the lower and upper indexed positions, increases in the first direction.

21. The pedally propelled vehicle multi-speed gear system according to claim 18, wherein the multi-speed gear system comprises a number of different gear-ratios, and
wherein the balls comprise first and second balls separated by a first number of indexed positions equal to the number of different gear-ratios.

22. A method for producing the pedally propelled vehicle multi-speed gear system according to claim 1, the gear system including an outward clutch element and a housing cover, the outward clutch element being configured to drive the housing cover with matching dogs, the housing cover including inner first and second support cylindrical surfaces disposed below and above the dogs, respectively, the method comprising:
casting or forging the housing cover with the first cylindrical surface and the dogs extending in a position to allow the housing cover to be removed from the mold; and
lathing the upper part of the dogs to produce the second cylindrical surface.

* * * * *